No. 842,779. PATENTED JAN. 29, 1907.
D. W. FREEMAN.
LOGGING DOG OR SWAMPING HOOK.
APPLICATION FILED FEB. 24, 1906. RENEWED DEC. 29, 1906.
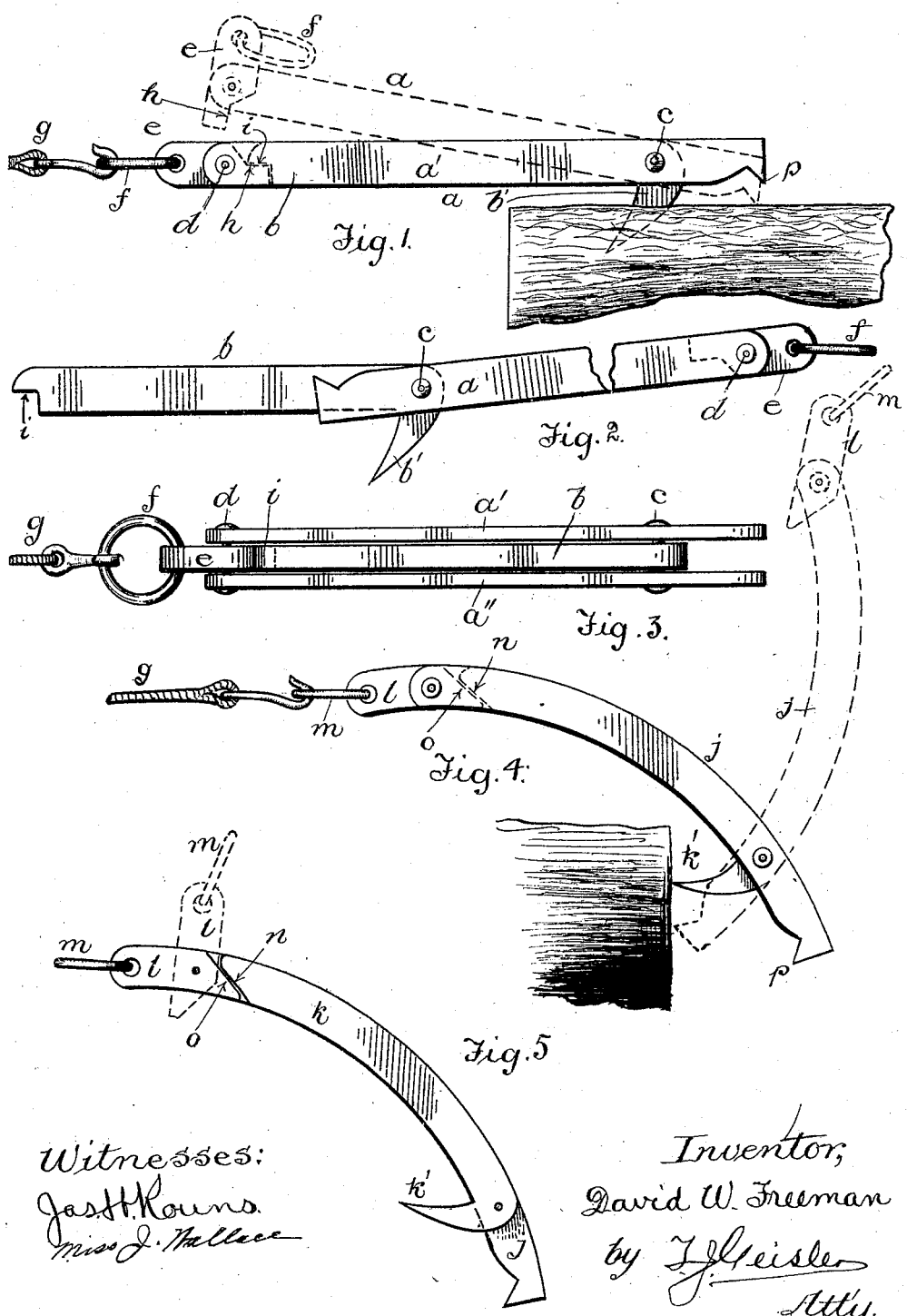

UNITED STATES PATENT OFFICE.

DAVID W. FREEMAN, OF FISHHAWK, OREGON.

LOGGING-DOG OR SWAMPING-HOOK.

No. 842,779.     Specification of Letters Patent.     Patented Jan. 29, 1907.

Application filed February 24, 1906. Renewed December 29, 1906. Serial No. 350,046.

*To all whom it may concern:*

Be it known that I, DAVID W. FREEMAN, a citizen of the United States, and a resident of Fishhawk, county of Columbia, State of Oregon, have invented a new and useful Improvement in Logging-Dogs or Swamping-Hooks, of which the following is a specification, reference being had to the accompanying drawings as constituting a part thereof.

This invention has for its object to obtain a so-called "logging-dog" or "swamping-hook" which shall embody ample strength and be adapted to be readily disengaged from—*i. e.*, pried out of—the log and which is especially contrived to disengage itself from the log in case the latter starts to roll down an embankment. The accident referred to is of frequent occurrence and is fraught with great danger, for if the log gains any headway it will exert such a sudden and irresistible pull as to drag everything with it.

To this end my improved logging-dog is constructed and operated as hereinafter described, and illustrated in the drawings.

In the latter, Figure 1 shows a section of a log having my improved dog fastened thereto, and the log is supposed to be drawn over the ground. The dotted outline of the dog illustrates the manner in which the same is pried out of the log. Fig. 2 illustrates the position of the parts while dragging my hook back over the ground. Fig. 3 is a top view corresponding with Fig. 1. Fig. 4 shows my logging-dog so modified as to be serviceable for fastening to the end of a log, the dotted outline illustrating the action of the parts when disengaging the dog from the log; and Fig. 5 shows a dog of the type seen in Fig. 4 with the near side of the shank removed.

The letters designate the parts referred to.

My device may be made straight, as shown in Figs. 1, 2, and 3, or curved, as shown in Figs. 4 and 5, its structure in this respect being adapted to the use to which it is to be put, as illustrated in said figures. In other respects the construction of my device is substantially the same.

My device comprises a shank $a$, made of two members $a'$ $a''$, having pivoted between them at one end $c$ a bar $b$, made with a bill $b'$. To the opposite end $d$ is pivotally fastened a link $e$, provided with a ring $f$, by which my swamp-hook is fastened to the hook of the hauling-cable $g$. The link $e$ is made with a shoulder $h$, and the free end of the bar $b$ is made with a shoulder $i$.

Referring to the style of swamp-hook shown in Fig. 1, when the same is in use to pull a log it will be arranged as shown in Fig. 1, the shoulder $i$ of the free end of the bar $b$ resting on the shoulder $h$ of the link $e$, and the harder the pull on the hauling-cable the firmer will the parts be retained in their position. When it is desired to pull out the bill $b'$ of the bar $b$ from the log, the link $e$ of the shank $a$ is in the first place pulled up, as shown in Fig. 1, the effect of which is to disengage such link from the shouldered end of the bar $b$, and continuing now the upward pull on the link $e$ the shank members are caused to act as a crowbar, as it were, such action being shown by the dotted outline of the shank in Fig. 1. The shank $a$ is preferably made with a point $p$ to take better hold while prying. After the bill $b'$ of the bar $b$ has been pried out the shank will be brought forward, and the parts become arranged as shown in Fig. 2. When so arranged, my device may be dragged over the ground without danger of catching the bill $b'$ in the ground.

In practice of course the ring $f$ is not attached directly to the hauling-cable, but the logs are connected to the latter by short chain or cable lengths. Should it happen that a log while being hauled downgrade starts to run ahead too fast or rolls sidewise, the same would not be the cause of any danger, for the moment the log had gained sufficient headway to cause the chain connecting the same to the hauling-cable to pull up on the link $e$ the shank $a$ would pry the bill $b'$ of the bar or dog $b$ out of the log, and thus release such log, and thereby prevent dangerous consequences. It is to be noted that the bar $b$ is pivoted at the root of its bill $b'$.

The construction and operation of the style of my invention shown in Figs. 4 and 5 are substantially like those above described, and this type of my invention consists of a curved shank $j$, made of two parts like the shank $a$, having pivoted intermediate thereof a curved dog or bar $k$, made with a bill $k'$ and having a link $l$, provided with a ring $m$. In the examples shown in Figs. 4 and 5 the shoulders $n$ $o$ of the heel of the bar $k$ and the inner end of the link are made as straight bevel-surfaces, operating, however, the same as the shoulders of the bar $b$ and link $e$. The last two examples of my invention are adapted to have the hook driven into the ends of the logs instead of the sides, and it is obvious that the operation of prying out the bill is just the same as in the first examples.

I claim—

1. An article of the class mentioned, comprising a shank, a bar made with a bill and pivoted at the root of such bill to one end of the shank, and a link pivoted to the opposite end of the shank; the free end of the bar and the inner end of said link being respectively adapted to engage with each other, and so that one will lie on the other during the hauling of a log, but becoming disengaged the moment there is an upward pull on the link.

2. An article of the class mentioned, comprising a shank made of two parts, a bar made with a bill and pivoted at the root of such bill to one end of said shank, intermediate of its two parts, and a link pivoted to the opposite end of the shank; the free end of the bar and the inner end of said link being respectively adapted to engage with each other and so that one will lie on the other during the hauling of a log, but becoming disengaged the moment there is an upward pull on the link.

3. An article of the class mentioned, comprising a shank made of two parts, a bar made with a bill and pivoted at the root of such bill to one end of said shank, intermediate of its two parts, and a link pivoted to the opposite end of the shank; the free end of the bar and the inner end of said link being respectively adapted to engage with each other, and so that one will lie on the other during the hauling of a log, but becoming disengaged the moment there is an upward pull on the link, and the prying end of the shank being made with a point as $p$ to adapt the same to have a better hold while prying.

DAVID W. FREEMAN.

Witnesses:
 Isaac McKay,
 M. E. Page.